(12) United States Patent
Hirtz

(10) Patent No.: US 11,028,956 B2
(45) Date of Patent: *Jun. 8, 2021

(54) LINER FOR LATERAL PIPE LINE

(71) Applicant: SAK CONSTRUCTION, LLC, O'Fallon, MO (US)

(72) Inventor: Boyd Hirtz, Wentzville, MO (US)

(73) Assignee: SAK CONSTRUCTION, LLC, O'Fallon, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/592,507

(22) Filed: Oct. 3, 2019

(65) Prior Publication Data
US 2020/0088338 A1    Mar. 19, 2020

Related U.S. Application Data

(63) Continuation of application No. 15/833,388, filed on Dec. 6, 2017, now Pat. No. 10,502,356.

(60) Provisional application No. 62/430,642, filed on Dec. 6, 2016.

(51) Int. Cl.
| | | |
|---|---|---|
| *F16L 55/16* | (2006.01) | |
| *F16L 55/165* | (2006.01) | |
| *F16L 55/24* | (2006.01) | |
| *F16L 58/00* | (2006.01) | |
| *F16L 55/179* | (2006.01) | |
| *F16L 101/18* | (2006.01) | |
| *F16L 101/30* | (2006.01) | |

(52) U.S. Cl.
CPC ....... *F16L 55/1652* (2013.01); *F16L 55/1651* (2013.01); *F16L 55/179* (2013.01); *F16L 55/24* (2013.01); *F16L 58/00* (2013.01); *F16L 2101/18* (2013.01); *F16L 2101/30* (2013.01)

(58) Field of Classification Search
CPC . F16L 55/1652; F16L 55/1651; F16L 55/179; F16L 55/24; F16L 58/00
USPC ........................ 138/97, 98; 405/150.1, 184.2
See application file for complete search history.

(56) References Cited

U.S. PATENT DOCUMENTS

| | | | | |
|---|---|---|---|---|
| 6,029,726 A | ‡ | 2/2000 | Tweedie | B29C 63/28 156/379.6 |
| 6,696,174 B2 | ‡ | 2/2004 | Cercone | B23P 6/00 138/97 |
| 2002/0124898 A1 | ‡ | 9/2002 | Renaud | F16L 55/1651 138/98 |
| 2008/0078463 A1 | * | 4/2008 | Kiest | F16L 55/165 138/98 |
| 2011/0052325 A1 | ‡ | 3/2011 | Bateman | F16L 55/165 405/184.2 |
| 2012/0312407 A1 | ‡ | 12/2012 | Muhlin | F16L 55/179 138/98 |
| 2013/0019982 A1 | ‡ | 1/2013 | Kobayashi | B29C 63/36 138/97 |
| 2014/0048151 A1 | ‡ | 2/2014 | Bichler | F16L 55/1654 137/315.01 |

(Continued)

*Primary Examiner* — James F Hook
(74) *Attorney, Agent, or Firm* — Lewis Rice LLC

(57) ABSTRACT

Systems and methods for forming and deploying a pipe liner in a pipe main having a service lateral. The line is formed from three pieces of material. The piece of material forming the front top and of the main liner and the front of the lateral line has a cutout at the joint to reduce bunching, which can result in non-uniform liner thickness and may form obstructions at the joint.

10 Claims, 13 Drawing Sheets

(56) References Cited

U.S. PATENT DOCUMENTS

2015/0338014 A1‡ 11/2015 Bichler ............... F16L 55/1651
    138/98
2015/0345687 A1* 12/2015 Bichler ................ B32B 27/065
    138/98

\* cited by examiner
‡ imported from a related application

LINER FOR LATERAL PIPE LINE

CROSS-REFERENCE TO RELATED APPLICATIONS

This application is a Continuation of U.S. Utility patent application Ser. No. 15/833,388, filed Dec. 6, 2017, which claims benefit of U.S. Provisional Patent Application No. 62/430,642, filed Dec. 6, 2016. The entire disclosure of all the above documents is incorporated herein by reference.

BACKGROUND OF THE INVENTION

Field of the Invention

This disclosure is related to the field of pipe rehabilitation systems, specifically to cured-in-place pipe liners.

Description of the Related Art

Over time, underground pipelines utilized for the transport of fluids, gases, or other materials become damaged, worn or corroded from use and environmental factors. In the past, the methodologies utilized for rehabilitating underground pipelines were costly, labor intensive, and usually required the surrounding ground to be excavated to reach the pipe. The damaged section of pipe would then be patched or replaced, and the excavated ground refilled. This technique is severely disruptive to the surrounding environment and communities.

To avoid these problems, "trenchless" techniques were developed. One such trenchless technique is cured-in-place pipe, or CIPP. A CIPP liner is a jointless and seamless pipe liner placed inside an existing pipe, referred to in the art as the "host pipe." CIPP can be used to rehabilitate pipes in the water, sewer, gas, and chemical industries. In a CIPP rehabilitation, a felt tube is saturated with a resin and then inverted or pulled into the host pipe. The resin saturation process is known as "resin impregnation" or "wet-out." This is typically done from an upstream access point, such as a manhole. Once in place, the resin-impregnated felt tube is allowed to cure forming a tight-fitting, jointless liner contained within the host pipe. The curing process typically uses heat or ultraviolet radiation to cure the resin and harden the liner.

An embodiment of this prior art process is depicted in FIG. 1. Underground pipes typically comprise a main service line 101. In the depicted figure, the main line 101 is buried underground and accessible through a number of vertical tunnels 104. These tunnels 104 are accessible through an opening 102 at the surface 106. The opening 102 may be, for example, a manhole 102. Usually, the main 101 is connected to one or more service laterals 103, which are small service lines 103 that direct flow to/from the main 101 to service points, such as a building.

Over time, the main 101 becomes clogged with debris and natural obstructions, such as roots and pieces of broken pipe. Typically, pipe rehabilitation begins by cleaning out the main 101. This may be done using any number of techniques, ranging from manual removal to use of remote cleaning technology, such as a high-pressure water jetter. Next, the cleaned pipe 101 interior is visually inspected, such as by using a remote camera system. This system is generally a mobile closed circuit camera system providing illuminated real-time images of the pipe 101 interior to a remote operator by wired or wireless connection. In this stage, the camera inspects the pipe 101 interior for remaining debris, or other problems that could inhibit the proper installation of a CIPP liner. The camera can also identify the location, size, and direction of active service connections 103.

Once the pipe 101 is cleaned and ready to accept a liner, a liner is impregnated with resin. The liner itself is generally a felt tube, generally made of polyester, fiberglass cloth, or another material suitable for resin impregnation. The resin impregnation process ranges from simple to sophisticated. In a simple embodiment, a set of rollers is used to distribute the resin over the tube. However, prevailing industry standards recommend that the tube be vacuum-impregnated, such as by a vacuum pump. This is because an uneven or incomplete distribution of resin will result in "dry" areas that do not properly cure, resulting in non-uniform thickness and weak points subject to structural failure.

Most resins are cured by the application of heat, and may begin to cure at room temperature. Thus, the preferred technique is to cool the liner as it is being impregnated. The liner is generally stored in a cooled environment during impregnation, such an ice bath, and is kept chilled for transportation to the installation site, such as via a refrigerated truck. The process of impregnating the liner, known in the art as "wet-out," may take place onsite, such as in a specially designed mobile wet-out vehicle, but is more commonly performed at a special-purpose facility and trucked cold to the installation site.

The wet-out process typically involves feeding the liner through a calibrated roller to apply the resin, preferably with a vacuum-assist to remove and minimize trapped air. Next, the saturated liner is wound on a roller in an inversion tank. This typically involves sealing the liner at one end, and attaching a pullback line to the sealed end. The liner is then rolled onto the roller in the inversion tank. The inversion tank comprises a pressurized container with an egress pipe at one end. Once the saturated liner is rolled into the inversion tank, the lead end of the rolled liner is fed out through the egress pipe and the tank is sealed. The lead end is folded back or cuffed around the egress pipe from the tank, which allows the inversion process to begin.

Pressure is applied within the tank via water or air, forcing the liner to invert progressively into the host pipe. Because the liner is still in a wet state, it can negotiate corners and bends, conforming to the interior shape of the host pipe. The liner is then cured, usually through the application of hot water, steam, or another source of heat. Once the liner is cured, the ends are cut open and another visual inspection is conducted to confirm that the installation was successful.

One problem with this process is the blocking of service laterals. When the CIPP liner is inserted into the main 101, the deployed liner will block the connection between the main 101 and the service laterals 103. This is one reason to visually inspect the main 101 to identify the location, number, and size of service lateral openings before installing the CIPP liner. After the CIPP liner has been inserted and cured, a remote cutting device is inserted into the newly lined main 101 to cut holes in the CIPP liner at the appropriate locations to restore service to the laterals 103.

However, one problem with this solution process is that gaps can develop between the CIPP liner and the host pipe 101. This is because resins shrink upon curing, and the host pipe 101 often is soiled with fats, oils, and/or grease, which inhibit a bond from forming between the resin and the host pipe 101. This creates an annular space between the CIPP liner and the host pipe 101. This space exists in nearly all installations using CIPP technology, and varies in size from very small to significant. When the liner is cut to restore the service laterals 103, fluid access to these annular spaces may be provided. This can result in water, moisture, or other materials tracking through the annular spaces and entering into the fluid stream.

Another problem with prior art solutions concerns service laterals. In the prior art, a "top hat" solution is used, where a liner having a "brim" is inserted into the lateral and dried, with the "brim" sealing the lateral cut. However, this technique results in a weak point at the joint, susceptible to failure, and a potential protrusion/obstruction caused by the bunching of liner material around the lateral joint. Other systems which utilize a single piece liner with a portion for the main and the lateral pre-connected together are known, but they have a problem in that the connection is generally at a preformed angle not necessarily conforming to the actual lateral join. This can result in a bunching-up of liner material at the acute angle portion of the lateral join. This bunching-up can result in an imperfect liner cure and/or imperfect adhesion to the host as well as presenting a variety of possible weak points. Additionally, the presence of seams connecting the various parts of the liner together can also create weak points and making sure those seams are positioned in places where there is less likelihood of concerning failure is something that has not traditionally been taken into account.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is a liner configured for trenchless installation in a pipe having a service lateral, the liner comprising: a main pipe liner portion comprising a bottom and an opposing top comprising a front top and an opposing back top; and a service lateral liner portion attached to the main pipe liner portion, the service lateral liner portion comprising opposing lateral sides and a front and opposing back; wherein a first contiguous piece, a second contiguous piece, and a third contiguous piece form the main pipe liner portion and the attached service lateral liner portion when assembled together; wherein the first contiguous piece comprises the opposing lateral sides and the bottom; wherein the second contiguous piece comprises the front and the front top and a cutout portion disposed at the joint between the front and the front top; and wherein the third contiguous piece comprises the back and the back top.

In an embodiment, the liner is a cured-in-place pipe.

In another embodiment, the service lateral liner portion is attached to the main pipe liner portion at a non-perpendicular angle.

In still another embodiment, the first contiguous piece is in the configuration of a hexagonal center generally corresponding to the bottom and having two elongated rectangular arms attached at opposing sides of the hexagonal center and generally corresponding to the lateral sides.

In still another embodiment, the first contiguous piece is generally symmetrical around a midline through the hexagonal portion.

In still another embodiment, the angle from the midline to the major axis of each of the arms is the non-perpendicular angle.

In still another embodiment, the second contiguous piece is in the configuration of a trapezoidal element corresponding to the front top and attached to a generally rectangular arm corresponding to the front.

In still another embodiment, the cutout portion is disposed at the joint between the generally rectangular arm and the trapezoidal element.

In still another embodiment, the cutout portion is generally in the shape of a football formed by a top arc and a connected bottom arc.

In still another embodiment, the top arc is defined by the formula $$y = \left(\sqrt{\frac{25}{64}L^2 - x^2}\right) - \frac{3}{8}L$$

wherein L is the length of the major axis of the football shape.

In still another embodiment, the bottom arc is defined by the formula $$y = -\left(\sqrt{\frac{25}{64}L^2 - x^2}\right) - \frac{3}{8}L$$

wherein L is the length of the major axis of the football shape.

In still another embodiment, the third contiguous piece is in the configuration of a trapezoidal element corresponding to the back top and attached to a generally rectangular arm corresponding to the back.

In still another embodiment, the first contiguous piece, the second contiguous piece, and the third contiguous piece are made from fabric.

Also described herein, among other things, is a method for forming a liner comprising: providing a first contiguous piece comprising a hexagonal center generally corresponding to a bottom of a main pipe liner and having two elongated rectangular arms generally corresponding to lateral sides of a service lateral liner attached to the main pipe liner, the first contiguous piece being symmetrical around a midline of the hexagonal center; providing a second contiguous piece comprising a trapezoidal element corresponding to a front top of the main pipe liner and attached to a generally rectangular arm corresponding to a front of the service lateral; providing a third contiguous piece comprising a trapezoidal element corresponding to a back top of the main pipe liner and attached to a generally rectangular arm corresponding to a back of the service lateral; removing from the second contiguous piece an amount of material at the joint between the trapezoidal element and the attached generally rectangular arm, the amount of material being in the shape of a football defined by a top arc and an opposing bottom arc; and assembling the first contiguous piece, the second contiguous piece, and the third contiguous piece form the main pipe liner portion and service lateral liner attached thereto at the angle between the midline and the major axis of each of the arms.

In an embodiment, the top arc is defined by the formula $$y = \left(\sqrt{\frac{25}{64}L^2 - x^2}\right) - \frac{3}{8}L$$

wherein L is the length of the major axis of the football shape.

In another embodiment, the bottom arc is defined by the formula $$y = -\left(\sqrt{\frac{25}{64}L^2 - x^2}\right) - \frac{3}{8}L$$

wherein L is the length of the major axis of the football shape.

In still another embodiment, the first contiguous piece, the second contiguous piece, and the third contiguous piece are made from fabric.

In still another embodiment, the liner is a cured-in-place pipe.

In still another embodiment, the method further comprising installing the assembled liner in a pipe main having a service lateral attached thereto at the non-perpendicular angle such that the main liner lines the pipe main and the service lateral liner lines the service lateral.

In still another embodiment, the angle is a non-perpendicular angle.

DESCRIPTION OF THE PREFERRED EMBODIMENT(S)

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

Figure 1:
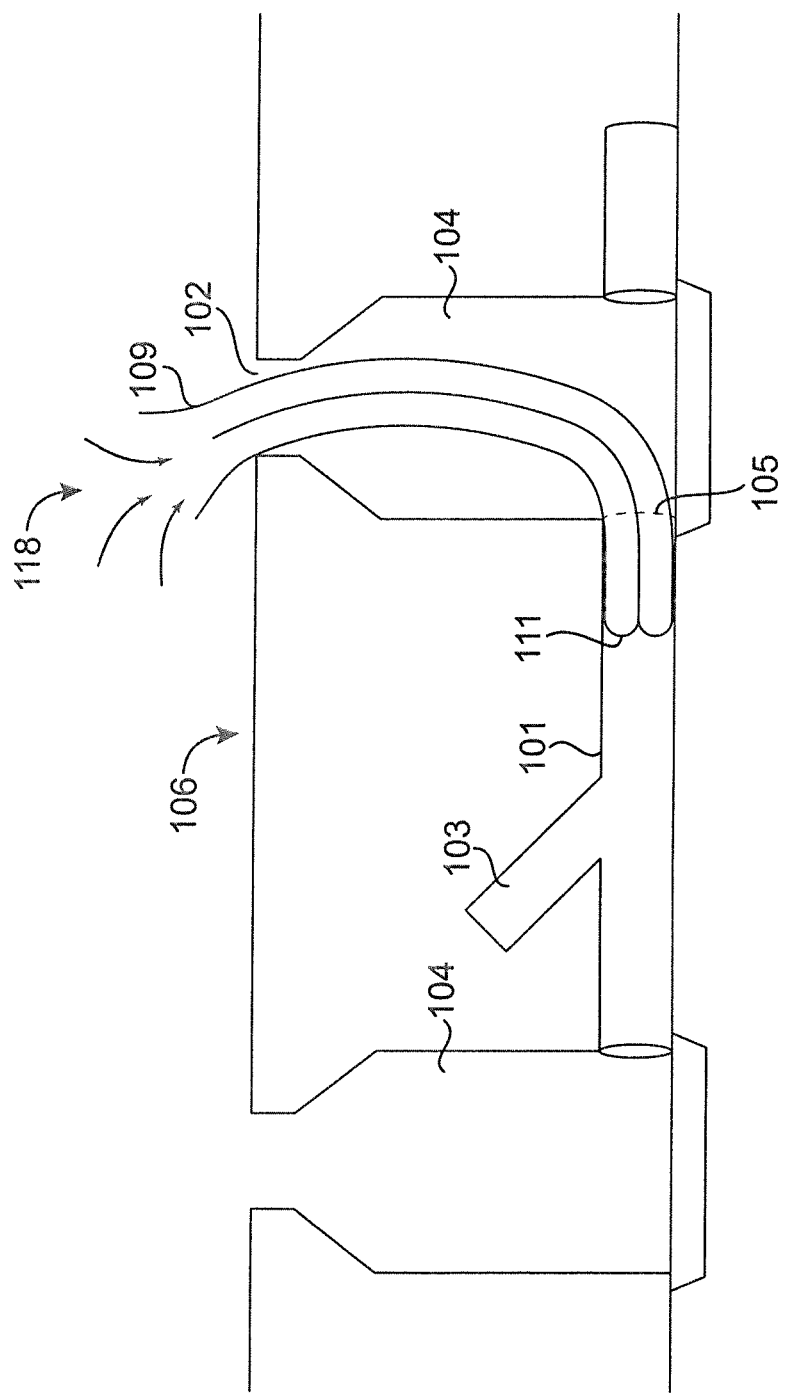
FIG. 1 depicts a diagram of a prior art cured-in-place pipe ("CIPP") liner installation process.
Figure 2A:
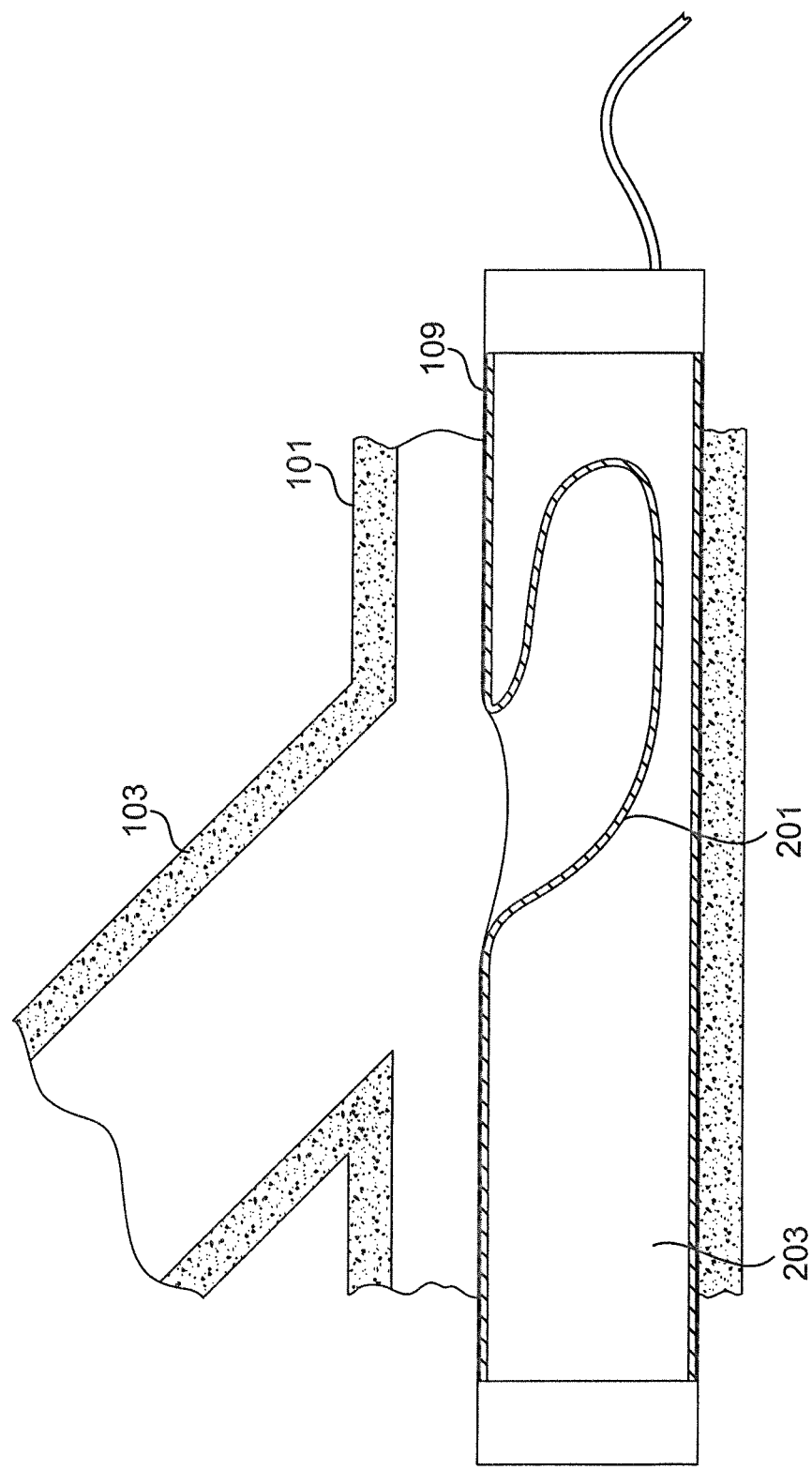
FIGS. 2A and 2B provide a diagram of a service lateral liner.
Figure 2B:
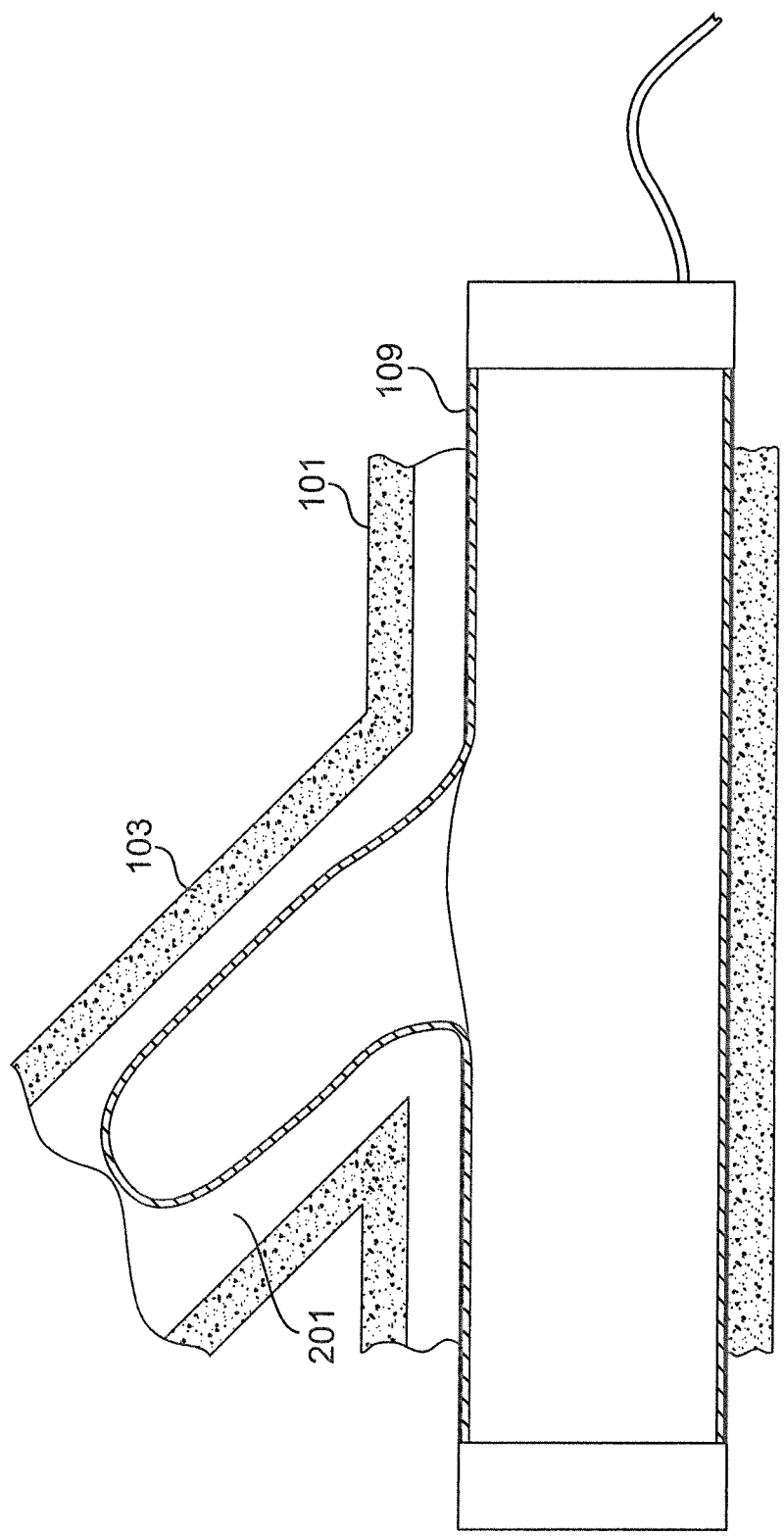

Described herein, among other things, is a CIPP liner including a branch liner for a service lateral which is designed to limit or inhibit material bunching. An embodiment of such a liner is depicted in FIG. 2A. In the depicted embodiment of FIG. 2A, a main liner 109 is disposed within a main 101 having at least one service lateral 103. The main liner 109 includes a lateral liner 201 inverted within the main liner 109. To install the lateral liner 201, the main liner 109 is positioned so that the joint between the main liner 109 and lateral liner 201 is situated at the joint 203 between the main line 101 and the service lateral 103. Next, pressure is applied to cause the branch liner 201 to invert into the service lateral 103. This is depicted in FIG. 2B. This installation has the advantage of providing a seamless and jointless liner between the main 101 and lateral 103, reducing the problems caused by spaces between the liner 109 and main 101.

Figure 3:
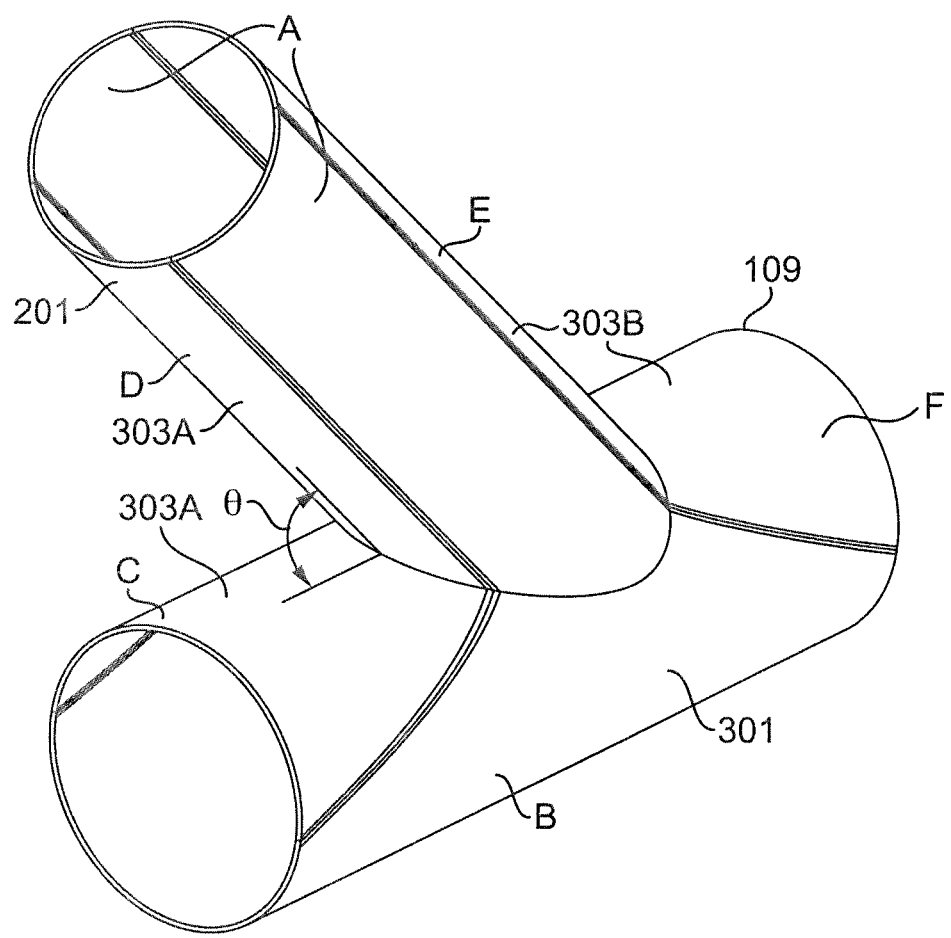
FIG. 3 depicts an embodiment of a CIPP liner for a service lateral according to the present disclosure.

In FIG. 3, an embodiment of such a liner 109 is shown. In the depicted embodiment of FIG. 3, the liner 109 is constructed of three different pieces 301, 303A and 303B, which are assembled to form the liner 109. In the depicted embodiment, the lateral sides A of the service liner 201 and the bottom portion B of the main liner 109 comprise a first contiguous piece 301 of liner material. The front D of the service liner 201 and the front top C of the main liner 109 comprise a second contiguous piece 303A of liner material. The back E of the service liner 201 and the back top F of the main liner 109 comprise a third contiguous piece 303B of liner material. The relative directional terms "front," "back," and "lateral sides" should be understood with respect to the axial length of the main 101, as in, for example, FIG. 3.

The depicted liner 109 is configured for use with a service lateral that connects to the main 101 at a non-perpendicular angle θ. In the depicted embodiment, θ is about sixty degrees as measured from the axis of main 101.

Figure 4A:
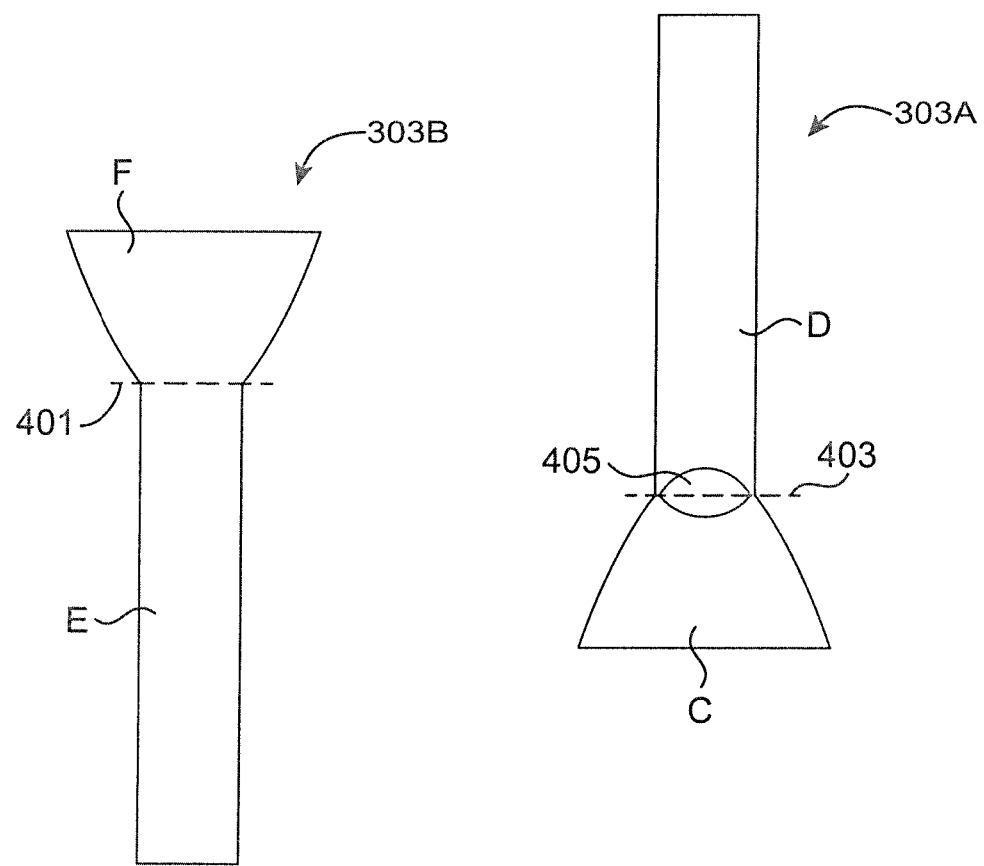
FIG. 4A depicts embodiments of front and back pieces for a CIPP liner for a service lateral according to the present disclosure.
Figure 4B:
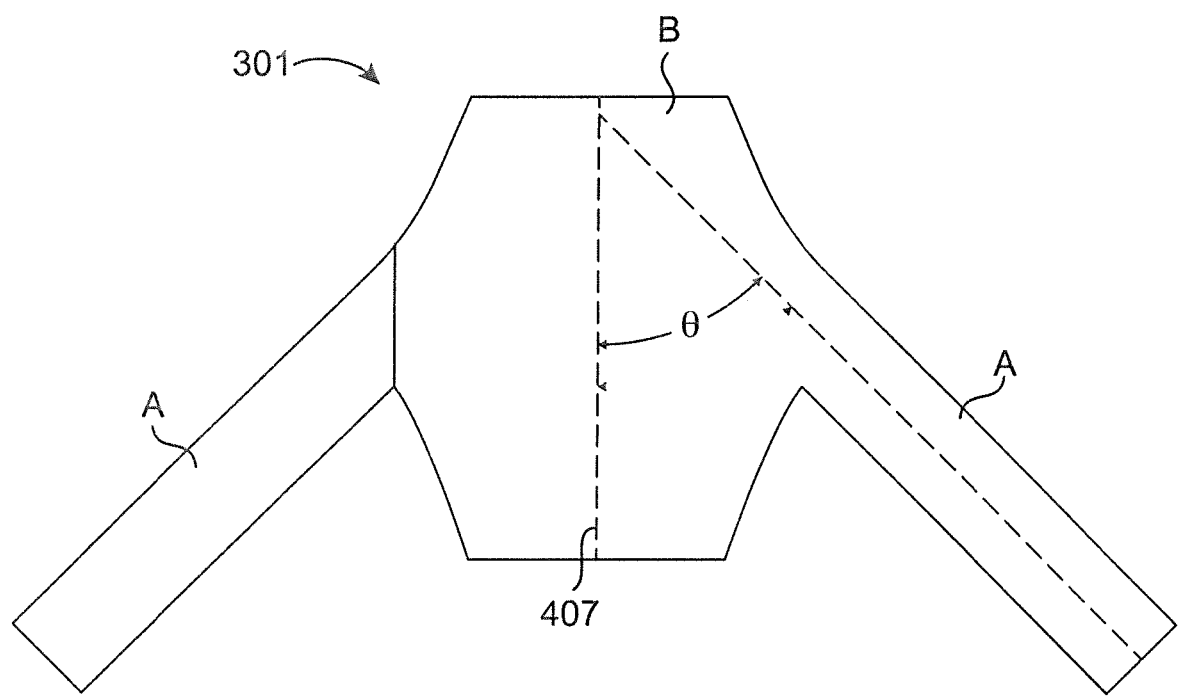
FIG. 4B depicts an embodiment of a bottom/side piece of a CIPP liner for a service lateral according to the present disclosure.
Figure 4C:
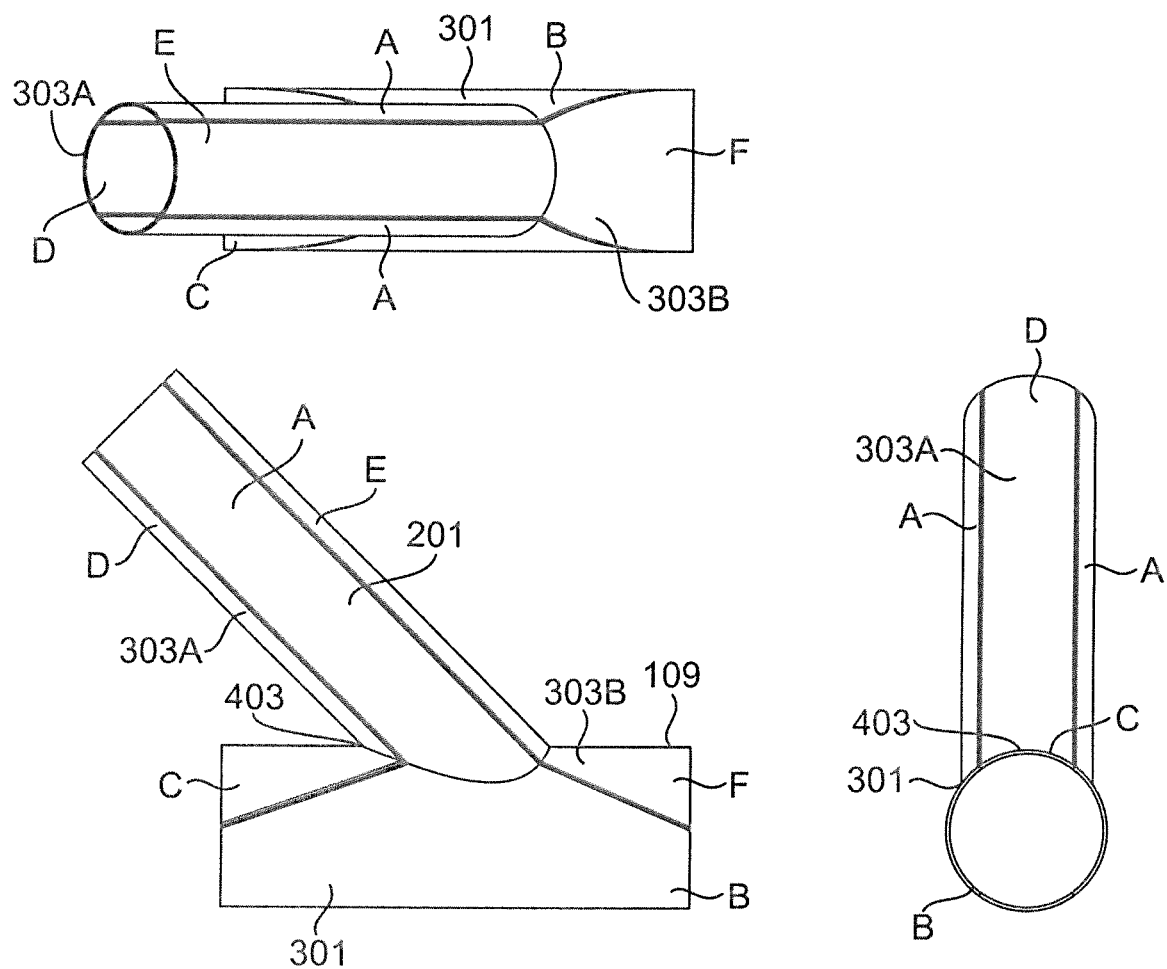
FIG. 4C provides a set of perspective drawings of an embodiment of an assembled CIPP liner for a service lateral comprised of a plurality of connected pieces according to the present disclosure.

Pieces 301, 303A, and 303B are further depicted in FIGS. 4A and 4B. As shown in FIG. 4B, the first piece 301 comprises a generally hexagonal center B with two generally rectangular arms A attached thereto and extending therefrom at opposing sides of the hexagon, the piece 301 being generally symmetrical at a midline 407. The angle θ between the midline 407 and the major length of the arms A is about the same as the angle θ of the lateral 103 to the main 101. As shown in FIG. 4A, the second piece 303A is comprised of a generally rectangular arm D corresponding to the front D of the lateral liner 201, and connected to a generally trapezoidal element C corresponding to the front top C of the main liner 109. The third piece 303B is also comprised of a generally rectangular arm E corresponding to the back side E of the lateral liner 201, and is connected to a generally trapezoidal component F corresponding to the back top F of main liner 109.

To assemble the liner 109, the rectangular arms A of piece 301, shown in FIG. 4B, are folded towards each other, forming the sides A of the lateral liner 201. The hexagon B forms the bottom B of the main liner 109. Piece 303B is folded 401 at about the connection point between the rectangle E and the trapezoid F, and piece 303A is likewise folded 403 at about the connection point between rectangle D with trapezoid C. The three pieces 301, 303A and 303B are sewn together to form the depicted liner of FIG. 3. FIG.

Figure 4D:
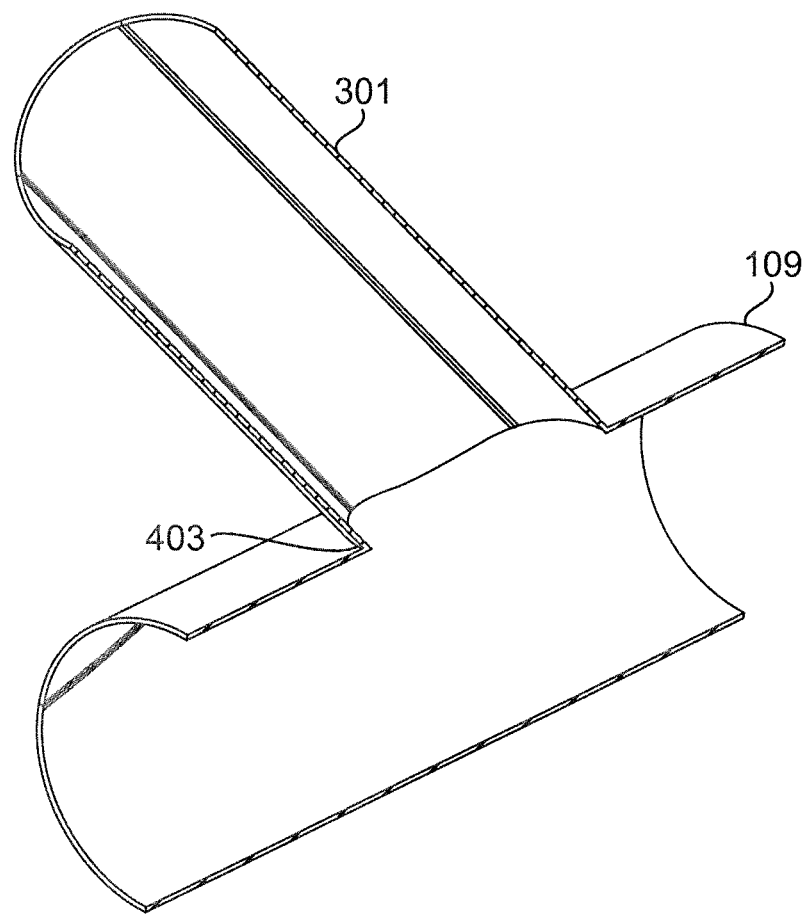
FIG. 4D depicts a cutaway diagram of an embodiment of a CIPP liner for a service lateral according to the present disclosure.

4C depicts perspective drawings of the assembled liner 109 showing the corresponding connection of pieces 301, 303A, and 303B. Similarly, FIG. 4D depicts a cutaway diagram of the assembled liner 109.

In the depicted embodiment of FIGS. 3 and 4A-4D, the angle θ between the service lateral 103 and the main line 101 is non-perpendicular. If the fold 403 is made in piece 303A to assemble the liner 109, trapezoidal portion C is at an acute angle to the rectangular portion D. This acute angle causes the material of piece 303A around the fold 403 to crinkle, or bunch up. This in turn can result in non-uniform thickness, and may form an obstruction at the joint between the main 101 and service lateral 103. It is thus desirable to prevent or inhibit bunching up of the felt material of the liner tube 109.

Figure 6:
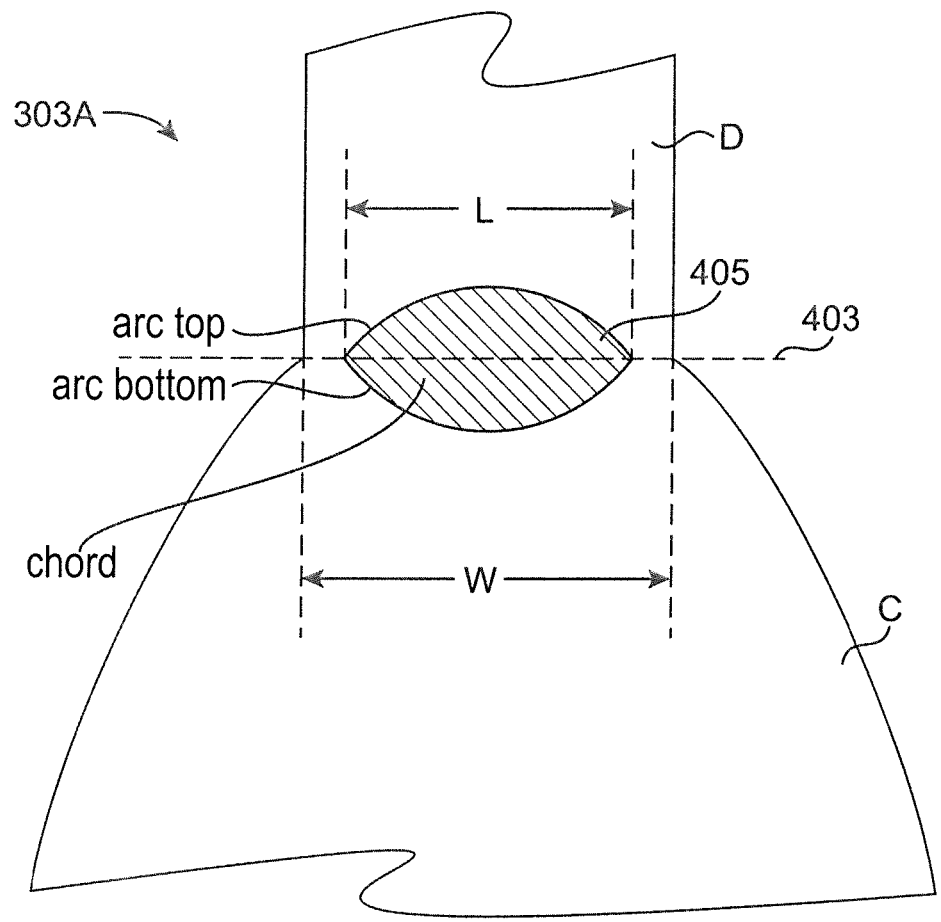
FIG. 6 depicts an embodiment of a CIPP liner for a service lateral having a cutaway area according to the present disclosure.

To do this, an amount of material is removed 405 at the folding point 403. The amount and shape of the material to be removed 405 varies with the angle and size of the piece, and is generally configured in the shape of two opposing arcs joined at their end points, or a "football" shape. This shape 405 is shown in FIG. 4A, and is shown in more detail in FIG. 6. In the depicted embodiment, the shape 405 of the removed material is defined by two circular arcs, $\text{arc}_{top}$ and $\text{arc}_{bottom}$. In the depicted embodiment, $\text{arc}_{top}$ is defined as that portion of the circular arc defined by Equation 1 located above the x-axis (positive y-value).

$$y = \left(\sqrt{\frac{25}{64}L^2 - x^2}\right) - \frac{3}{8}L \qquad \text{Equation (1)}$$

where L is the length of the chord at the x-axis

In the depicted embodiment, the shape of $\text{arc}_{bottom}$ is defined as that portion of the circular arc defined by Equation 2 located below the x-axis (negative y-value).

$$y = -\left(\sqrt{\frac{25}{64}L^2 - x^2}\right) - \frac{3}{8}L \qquad \text{Equation (2)}$$

where L is the length of the chord at the x-axis

Figure 7:
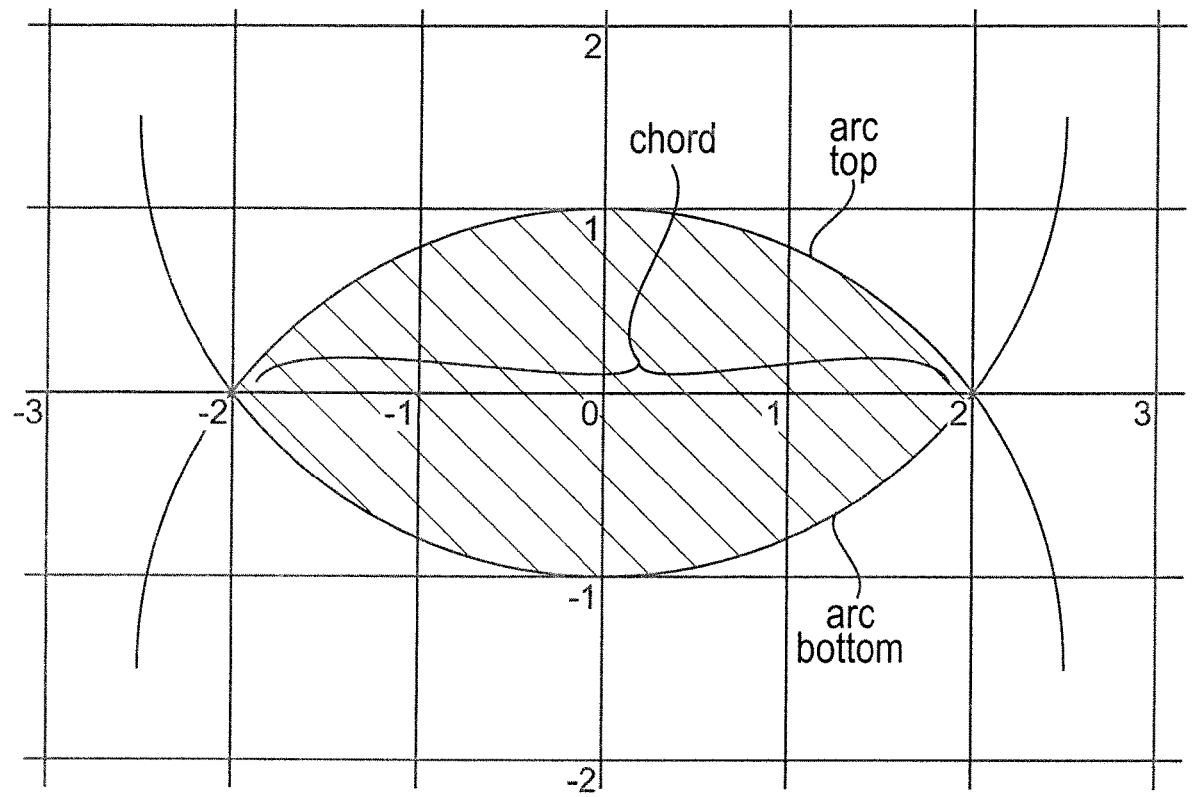
FIG. 7 depicts a graph of an embodiment of a cutaway area for use with a CIPP liner according to the present disclosure.

Illustrative examples of these two arcs, having an L=4, are shown in FIG. 7.

By removing the football-shaped portion 405, bunching is inhibited because the fabric which would normally crinkle or bunch up is no longer present. This allows the piece 303A to be assembled in an acute angle with reduced risk of improper curing or forming an obstruction. It should be noted that the length L of the chord defining the midpoint of the shape 405 is generally less than the width W of the rectangular portion D of the piece 303A. This allows for at least some amount of fabric to remain connecting portions C and D together.

Figure 5A:
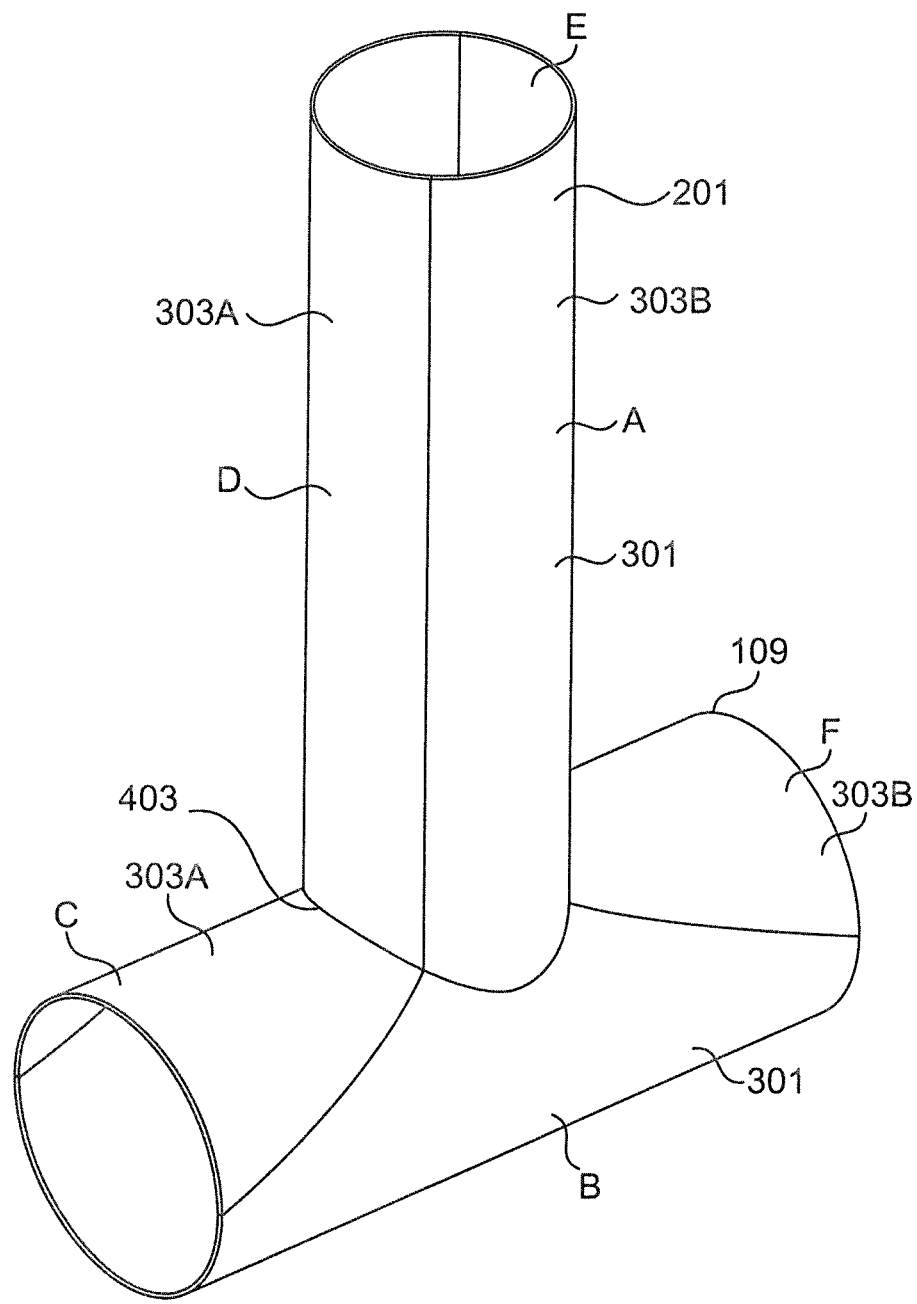
FIG. 5A depicts an alternative embodiment of a CIPP liner for a service lateral according to the present disclosure.
Figure 5B:
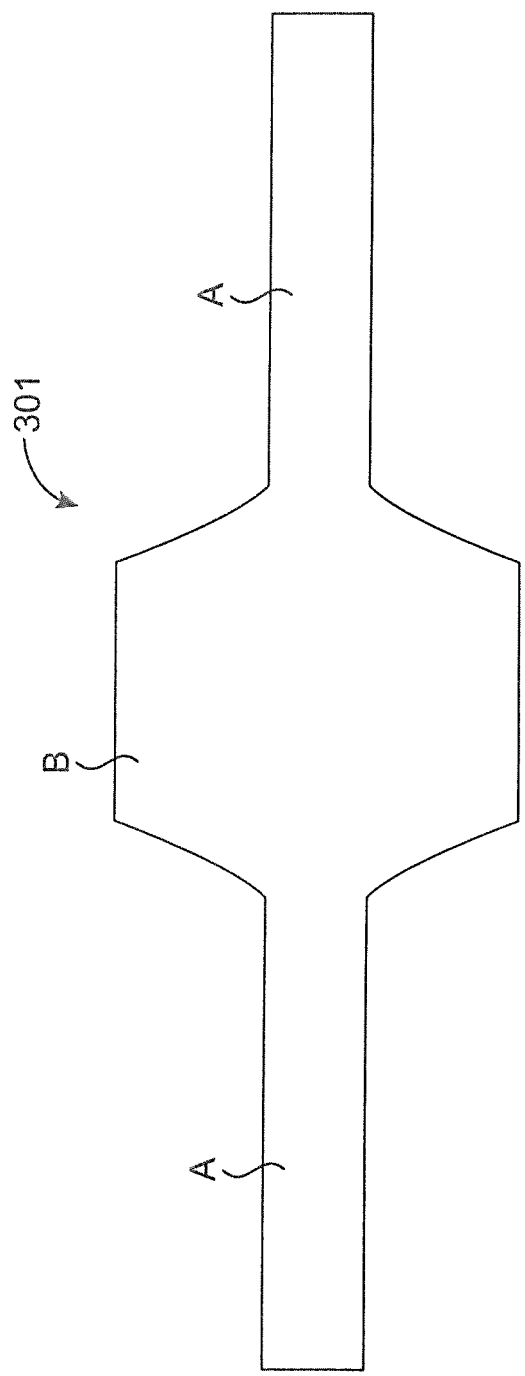
FIG. 5B depicts an alternative embodiment of a bottom and side piece of a CIPP liner for a service lateral according to the present disclosure.
Figure 5C:
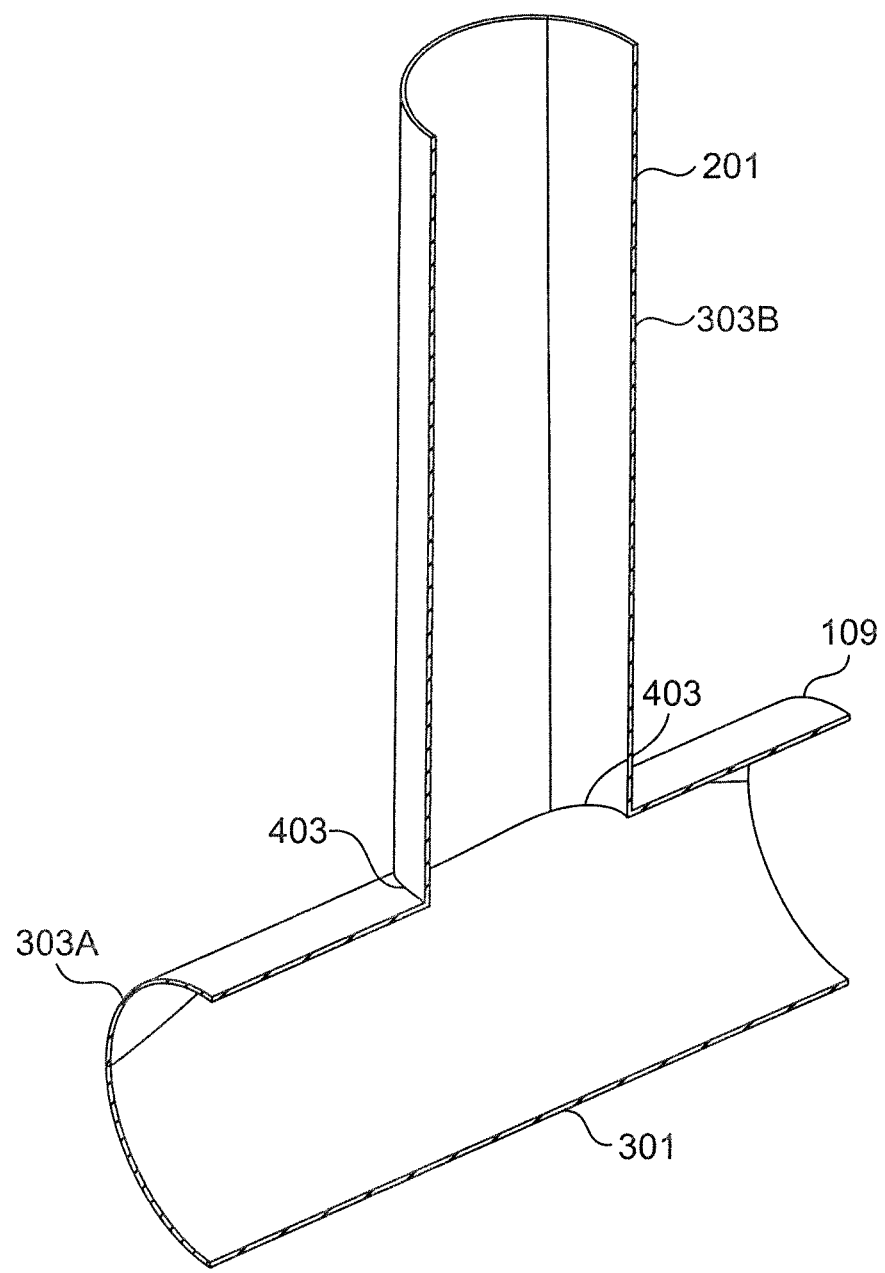
FIG. 5C depicts a cutaway diagram of an alternative embodiment of a CIPP liner for a service lateral.

While this technique is perhaps most applicable to an acute angle θ, due to the propensity for bunching with such an angle, it is also useful with any angle, including a perpendicular angle. As shown in the depicted embodiment of FIG. 5, a liner 109 with a lateral 201 at a generally perpendicular angle may also use the formulae described in Equations 1 and 2 to cut out an amount of fabric 405 at the folding point 403 in order to reduce or inhibit bunching during assembly. FIG. 5B depicts an embodiment of a first piece 301 for use in assembling a perpendicular lateral liner 201, and FIG. 5C depicts a cutaway diagram of an assembled liner 109 having perpendicular lateral 201.

This structure reduces or eliminates the problem of bunching, as the structures defined by the formulae set forth herein and/or by related mathematical formulae as would be understood by one of ordinary skill in the art, reduce the amount of liner material used to form the lateral joint, resulting in a smoother, continuous connection with less material bunching, reducing or eliminating weak points caused by prior art systems.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A liner configured for trenchless installation in a pipe having a service lateral, the liner comprising:
   a main pipe liner portion comprising a bottom and an opposing top comprising a front top and an opposing back top; and
   a service lateral liner portion attached to said main pipe liner portion, said service lateral liner portion comprising opposing lateral sides and a front and opposing back;
   wherein a first contiguous piece, a second contiguous piece, and a third contiguous piece form said main pipe liner portion and said attached service lateral liner portion when assembled together;
   wherein said first contiguous piece comprises said opposing lateral sides and said bottom;
   wherein said second contiguous piece comprises said front and said front top and an amount of material is removed at the joint between said front and said front top to form a cutout in said second contiguous piece; and
   wherein said third contiguous piece comprises said back and said back top.

2. The liner of claim 1, wherein said liner is a cured-in-place pipe liner.

3. The liner of claim 1, wherein said service lateral liner portion is attached to said main pipe liner portion at a non-perpendicular angle.

4. The liner of claim 3, wherein said first contiguous piece is in the configuration of a hexagonal center generally corresponding to said bottom and having two elongated rectangular arms attached at opposing sides of said hexagonal center and generally corresponding to said lateral sides.

5. The liner of claim 4, wherein said first contiguous piece is generally symmetrical around a midline through said hexagonal portion.

6. The liner of claim 5, wherein the angle from said midline to the major axis of each of said arms is said non-perpendicular angle.

7. The liner of claim 3, wherein said second contiguous piece is in the configuration of a trapezoidal element corresponding to said front top and attached to a generally rectangular arm corresponding to said front.

8. The liner of claim 7, wherein said cutout is disposed at the joint between said generally rectangular arm and said trapezoidal element.

9. The liner of claim 3, wherein said third contiguous piece is in the configuration of a trapezoidal element corresponding to said back top and attached to a generally rectangular arm corresponding to said back.

10. The liner of claim 1, wherein said first contiguous piece, said second contiguous piece, and said third contiguous piece are made from fabric.

* * * * *